United States Patent [19]

Jones

[11] Patent Number: 4,628,672
[45] Date of Patent: Dec. 16, 1986

[54] ROTARY CUTTER

[76] Inventor: Grover W. Jones, 1235 NW. Saltzman Rd., Portland, Oreg. 97229

[21] Appl. No.: 750,208

[22] Filed: Jul. 1, 1985

[51] Int. Cl.$^4$ .................................... A01D 55/18
[52] U.S. Cl. ............................. 56/295; 30/347
[58] Field of Search ......................... 30/347; 56/295

[56] References Cited

U.S. PATENT DOCUMENTS

| | | | |
|---|---|---|---|
| 2,751,737 | 6/1956 | Herod | 56/295 X |
| 3,343,355 | 9/1967 | Freelander et al. | 56/295 |
| 3,910,017 | 10/1975 | Thorud et al. | 56/295 |
| 4,466,235 | 8/1984 | Cole | 56/295 |

Primary Examiner—Donald R. Schran
Attorney, Agent, or Firm—Henderson & Sturm

[57] ABSTRACT

Disclosed is an improved cutter that finds principal utility in, but is not limited to, lawn mowers of the type in which a cutter blade is rotated about an upright axis by a power source such as an electric motor, internal-combustion engine, etc. The disclosed improvement involves a blade that produces a slicing rather than a shearing action, accomplished by a blade design having diametrically opposed end portions, each sharpened to provide a slicing edge that is directed from a leading edge portion to a trailing edge portion, thus providing a blade of increased efficiency and requiring lower consumption of horsepower. The slicing edges may also be combined with conventional impact cutting edges.

7 Claims, 7 Drawing Figures

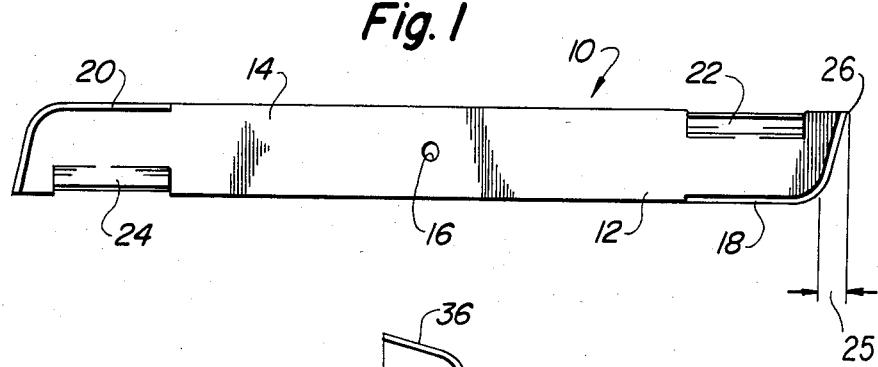
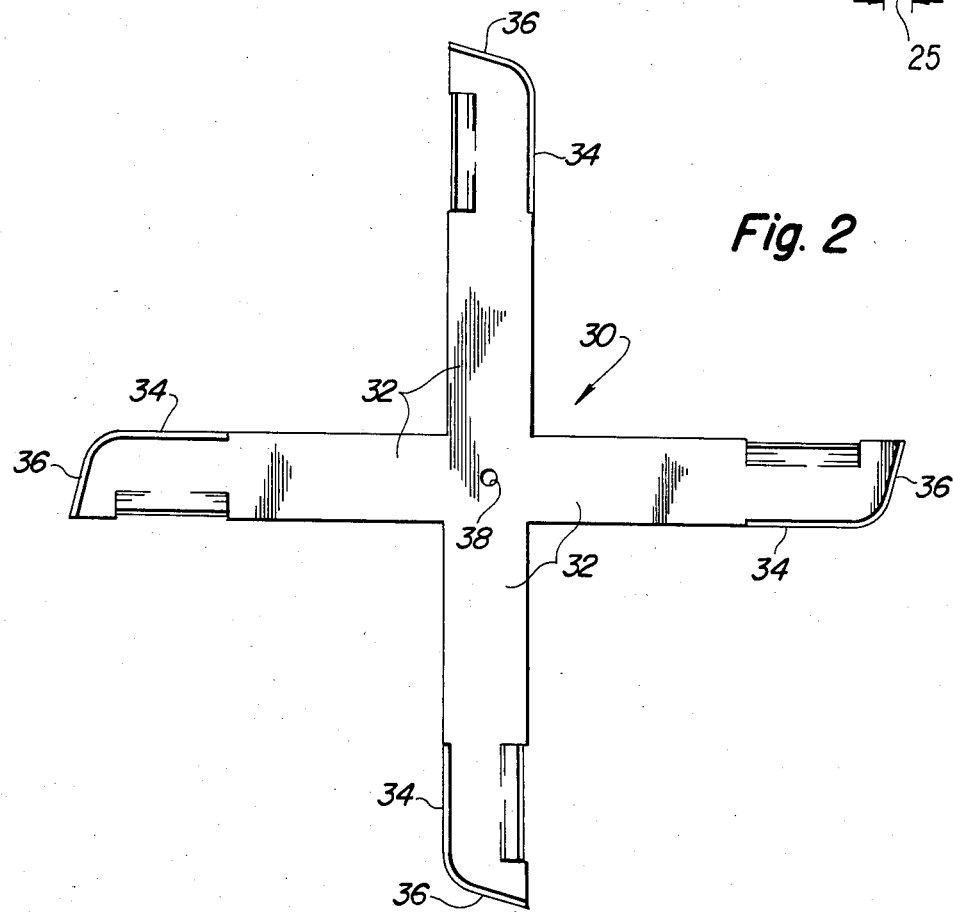
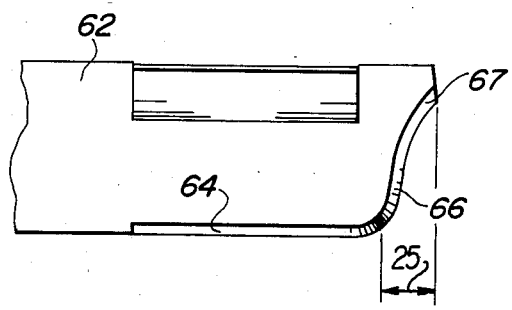

ROTARY CUTTER

BACKGROUND AND SUMMARY OF THE INVENTION

The improved cutter is especially adapted for use on a lawn mower of the type having a cutter blade rotatable about an upright axis, whereby the cutting action is initiated at the periphery or outermost radius of the rotating blade cutting edge as the blade is moved in a plane generally perpendicular to the orientation of the objects being cut; although, the principles of the invention have application to other cutters, particularly to those for cutting brush and like vegetation, for example.

The cutter blade in a conventional or typical rotary lawn mower has diametrically opposed arms, each provided with a sharpened leading edge and a trailing edge which is shaped to create a "fan action" for lifting the grass and blowing cut grass through an outlet. The leading edge is generally parallel to a radius through the center or axis of rotation and essentially midway between the leading and trailing edges and thus presents itself as a shear or impact edge to the vegetation encountered.

The present invention involves a blade having a slicing rather than a direct shearing action, and this is achieved by providing on a blade having at least a pair of diametrically opposed arms a slicing edge at each of the radially outermost extremities of the blade. Each slicing edge is directed rearwardly and also radially outwardly from the leading edge toward the trailing edge. The slicing edge is especially fashioned or configured so as to create angles as defined by the tangent to the arc of rotation and the tangent to the slicing edge at the point of contact with an object being sliced, of zero degrees to eighty degrees. Further the slicing edge is fashioned or configured to occur as a minimum within the radial distance from the outermost extremities of the blade an amount equal to the maximum exposure of the rotating blade to uncut grass that is encountered with each revolution of the blade as the mower is moved through the grass in a plane parallel to the plane of blade rotation. This radial distance can be defined by the following formula:

$$\frac{(720)(V)}{(N)(R)} = \text{Radial distance in inches}$$

Where:
V = Travel velocity of mower in feet per second (f.p.s.)
N = Number of cutting ends on blade
R = Revolutions per minute (r.p.m.) of rotating blade Use of this formula will demonstrate that in the typical rotary lawn mower having a forward velocity of two and one-half to three f.p.s. and a blade rotating at 2500 to 3000 r.p.m., the maximum exposure or radial distance of a two-edged blade to uncut grass is about one-half inch. According to the present invention, the slicing edge is fashioned or configured throughout this radial distance as a minimum in order to function as a slicing edge with or without an accompanying conventional or near conventional cutting edge.

In a modified form of blade, the slicing edge may be extended rearwardly and outwardly as a "flare" continuation of the basic slicing edge. In a further modification of the invention, each outer blade portion having the slicing edge is offset downwardly from the plane of rotation of the main body of the blade. Another modification provides a cutter blade having four arms spaced apart at ninety degrees about the axis of rotation, each arm having a slicing edge as described.

In one prior art example of modified cutter blade, each leading cutting edge has a slight rearward slope from the conventional position of a leading shearing edge but these slightly sloping edges are by no means slicing edges but function primarily as direct shearing edges and as an aid for expulsion of cut vegetation from the rotating blade. See the U.S. Pat. No. to Hill, 3,315,451.

Advantages of the invention are improved cutting action resulting in cleaner cutting and less stress on the vegetation; less torque load on the prime mover; less fluctuation in speed of rotation of the blade; and less impact stress on the blade in the event a hard object is encountered, resulting in longer edge life and longer intervals between edge sharpening.

Further features and advantages will appear as preferred embodiments of the invention are disclosed in detail in the ensuing description and accompanying sheets of drawings.

DESCRIPTION OF THE DRAWINGS

FIG. 1 is a plan view of a two-armed blade incorporating one form of the invention.

FIG. 2 is a plan view of a four-armed blade provided with the invention in one form.

FIG. 6 is a similar view showing a modified form of slicing edge.

DETAILED DESCRIPTION OF A PREFERRED EMBODIMENT OF THE INVENTION

Figure 3:
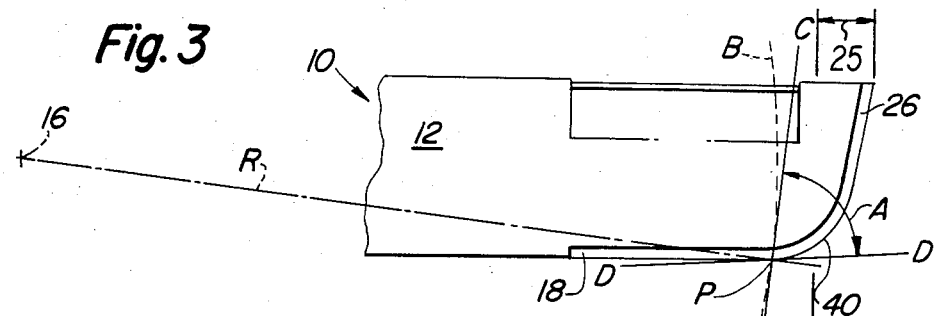
FIG. 3 is an enlarged, fragmentary view illustrating the geometry involved in shaping the slicing edge.

Reference will be had first to FIG. 1 for a brief description of that form of cutter comprising a cutter blade (10) having diametrically opposed radial arms (12) and (14) symmetrically fashioned at opposite sides of a central axis represented by a shaft-receivable mounting hole (16) by means of which the blade is carried for rotation as by an upright power-driven shaft (not shown), for example the shaft of an electric motor or internal-combustion engine as is typical of rotary low mowers. Because, for at least one reason, it is easier to provide the inventive slicing edges on a blade that has conventional or near-conventional characteristics, the blade chosen for purposes of illustration and not by way of limitation has its arms provided with sharpened leading cutting edges (18) and (20) respectively and trailing edges incorporating upturned fan or wind portions (22) and (24) respectively. The radially outermost ends of the arms have one form of the improved slicing edges (26) and (28) respectively, the details of which, as well as the details of modified slicing edges, will appear in connection with the description of FIGS. 3 through 7. The dimension (25) represents the maximum radial distance of uncut grass encountered by each revolution of the blade as measured from the outermost extremity of the blade.

FIG. 2 shows a four-armed blade (30) in which each arm (32) has cutting and slicing edges (34) and (36) respectively according to those of FIG. 1 and thus require no further decription except for the observation that the invention is not limited to two-armed blades. The FIG. 2 blade obviously rotates about a central axis represented by a central mounting hole (38).

Figure 4:
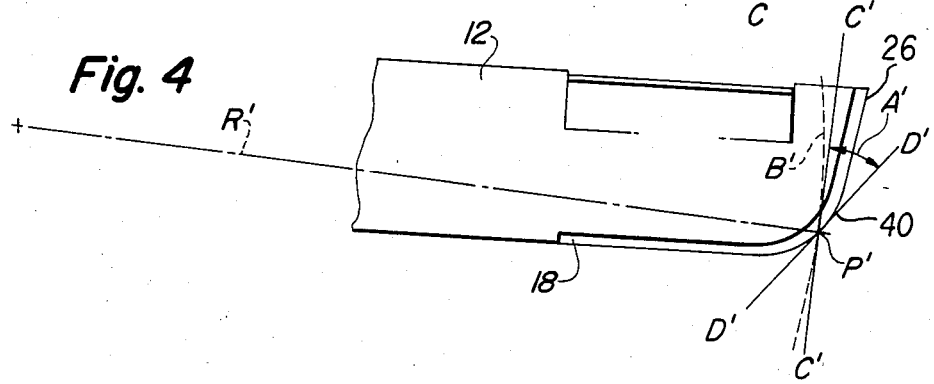
FIG. 4 is a similar view illustrating a phase in the changing nature of the slicing edge angle as the slicing edge contacts a relatively rearwardly disposed object to be cut.
Figure 5:
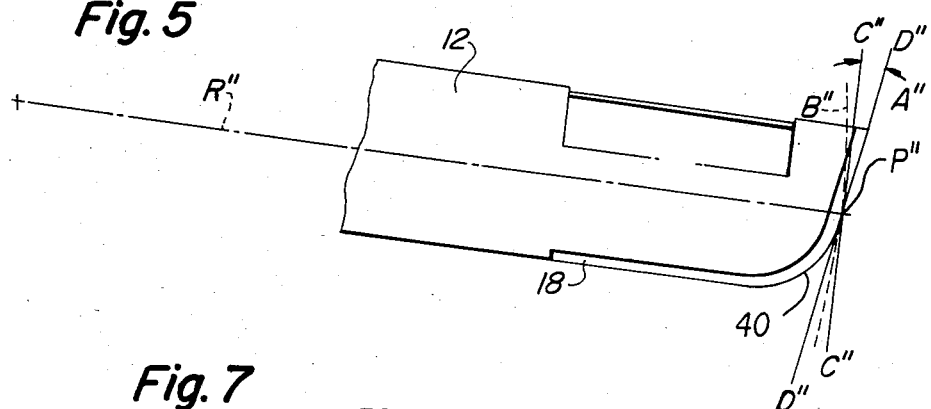
FIG. 5 illustrates a further phase in the changing nature of the angle.

Attention is now directed to FIGS. 3, 4 and 5 for amplification of the invention, at which point it should be noted that although only the arm (12) and its cutting and slicing edges are illustrated, what is said in that area applies equally to the cutting and slicing edges on the other arms in FIGS. 1 and 2.

As noted, the slicing edges are shown on blade arms having typical cutting edges; although, as will appear later, blades with slicing edges alone are operative. Taking the blade arm shown in FIGS. 3, 4 and 5 as representative, it is seen that the cutting edge merges into the slicing edge via a sharpened angle or radius (40) so that the cutting and slicing action may be regarded as continuous through the areas (40) and (26). It is further seen that the slicing edge (26) is directed rearwardly or in a trailing direction as well as radially outwardly, preferably according to a design based on geometrical relationships that yield the inventive configuration of the slicing edge within the dimension (25) as a minimum. In the three Figs. just noted, a radius R is drawn from the central axis as at (16) through a point P on the slicing edge represented by an object such as a stalk or spear of grass. An arc of rotation B, drawn about the axis (16), is shown by dotted lines as passing through the point P. A line C—C is drawn tangent to this arc B at the point P. A second line D—D is drawn tangent to the slicing edge, here at the part (40), at point P. The angle A between the lines C—C and D—D at the point P is the maximum preferred angle according to the illustrated design and here appears as an angle of about eighty degrees.

FIG. 4 shows a condition in which the arm has advanced relative to the object (or a subsequent object) represented by point P'. A radius R' about the axis (16) and through the point P' is followed by an arc of rotation B' through this point and a line C'—C' passes through this point as tangent to the arc B'. The point P' is further rearwardly than the point P in FIG. 3, and a line D'—D' tangent to the slicing edge at this point forms with the line C'—C' an angle A' about the point P' which in the slicing configuration shown is smaller than the angle A in FIG. 3; that is to say, the angle between the respective tangents varies along the slicing edge (26). The progressive changing of this angle can be plotted by selecting several points P, P', etc. along the slicing edge. FIG. 5 carries this a step further, using double-primed letters. In a preferred embodiment, the slicing edge angle may vary about zero degrees to about eighty degrees within the dimension (25) as a minimum and the intended slicing results are obtained within this range.

Figure 7:
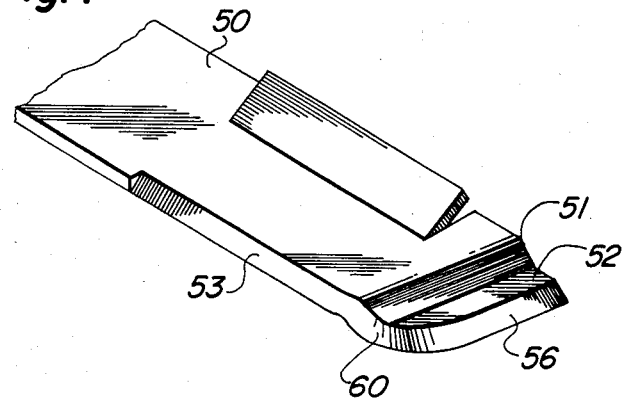
FIG. 7 is a perspective of the end portion of a blade in which the slicing edge portion is offset from the basic plane of the blade.

FIG. 7 shows a portion of a blade arm (50) having a radially outer portion offset at (51) to yield a terminal part (52) along the outer extremity of which is a slicing edge (56) like that at (26) on the blade of FIGS. 1, 3, 4 and 5. The blade arm has a conventional cutting edge (53) which merges via a sharpened angle or radius (60) with the slicing edge (56) so that continuous cutting merging into slicing is afforded along the portions (53), (60) and (56). In a typical blade rotating about a central axis, the offset is downwardly from the basic plane of the blade. It is understood of course that the offset modification can be incorporated into blades of FIGS. 1, 2 and 6 as well as in blades having no conventional-type cutting edges.

FIG. 6 shows a modified form of a slicing edge on a blade (62) that may be regarded as similar to the blade arms previously described, having a conventional leading cutting edge (64) that merges into a modifed form of slicing edge (66), the trailing portion of which flares outwardly and rearwardly as a sharpened portion (67). The part of the slicing edge between the cutting edge and the flare follows the pattern described in connection with FIGS. 3–5 and is within the range referred to there. The flare is an adjunct that is operative to establish cleaner cutting as a back-up for the slicing edge. Here again, this form of the invention can be incorporated into the other blade forms shown herein or in other types of blades needing a slicing edge on each arm.

As noted previously, experience has shown that the cutting action in a typical blade fashioned with conventional cutting edges is confined substantially to the outer half-inch or so of the total blade diameter. In a four-armed blade, this area would be reduced by one-half. In the offset form of the blade, the vertical part of the offset adds to the ability of the blade to throw cuttings radially outwardly. The invention, although described in terms of blade rotation about a vertical axis, is applicable to other situations in which the cutting plane is oriented so as to be perpendicular to the objects (grass and like vegetation for example) being cut.

Features and advantages not specifically pointed out will have become apparent to those versed in the art, as will various modifications and alterations apart from those disclosed, all without departure from the spirit and scope of the invention.

I claim:

1. A rotary cutter blade having a pair of radially directed arms diametrically opposed and symmetrically fashioned at opposite sides of a central axis about which the blade rotates, each arm having leading and trailing edge portions and a radially outermost outer edge, characterized in that the outer edge extends from the leading edge portion to the trailing edge portion as a sharpened slicer edge for a minimum of radial distance equal to the maximum width of uncut vegetation encountered by the blade on each revolution, said slicer edge being limited to a radially outermost extremity of the blade having a dimension, measured radially of the blade, on the order of the maximum width of uncut vegetation encountered by the arms on each revolution of the blade as the blade is advanced through the vegetation in a plane parallel to the plane of blade rotation, each slicer edge being directed primarily rearwardly and radially outwardly and so configured that the angle measured between tangents to the arc of rotation of the blade at any point on the slicer edge presenting contact of the rotating slicer edge with an object encountered by the slicer edge and the respective tangents to the slicer edge at said point varies within a preselected range of angles.

2. The cutter blade of claim 1, in which the angle is about zero at the trailing edge portion.

3. The cutter blade of claim 1, in which the angle varies between about thirty-five degrees to about zero.

4. The cutter blade of claim 1, in which the angle varies between about eighty degrees to about zero.

5. The cutter blade of claim 1, further characterized in that the leading edge is a cutting edge and merges into the slicer edge.

6. The cutter blade of claim 1, further characterized in that each arm has a portion that is straight in a plane normal to the axis of rotation and the slicer edge is formed on a further portion of the arm offset axially from said plane.

7. The cutter blade of claim 1, further characterized in that the slicer edge continues as a sharpened trailing portion directed arcuately rearwardly and radially outwardly.

* * * * *

UNITED STATES PATENT AND TRADEMARK OFFICE
CERTIFICATE OF CORRECTION

PATENT NO. : 4,628,672

DATED : December 16, 1986

INVENTOR(S) : Grover W. Jones

It is certified that error appears in the above-identified patent and that said Letters Patent is hereby corrected as shown below:

In Column 2, at Line 55, change "low" to --lawn--. In Column 3, at Line 58, after "vary" insert --from--. In Column 4, at Line 31, after "radially outwardly" insert -- When an adjoining cutting edge is combined with the slicing edge, the cutting edge serves as a backup for the slicing edge.--

Signed and Sealed this

Fourteenth Day of April, 1987

Attest:

DONALD J. QUIGG

Attesting Officer

Commissioner of Patents and Trademarks